Figure 1:
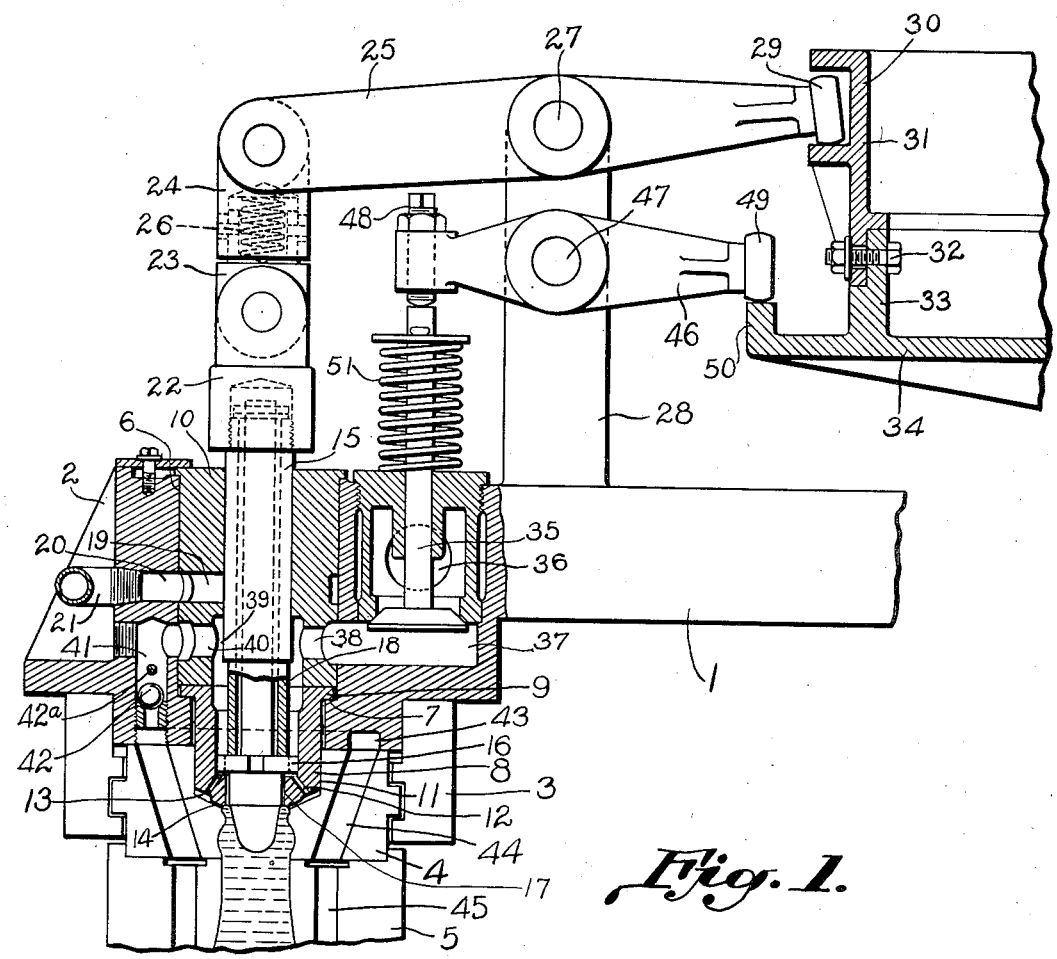
Figure 2:
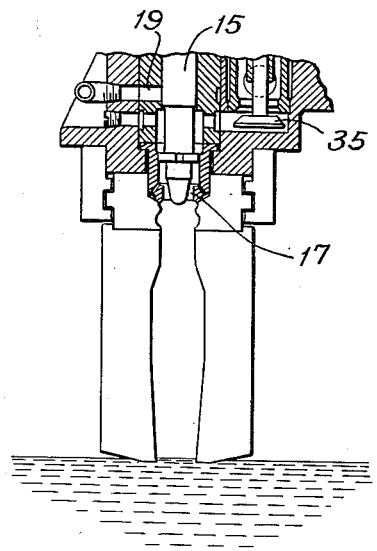

Nov. 1, 1932.  E. H. LORENZ  1,885,739

APPARATUS FOR FABRICATING GLASSWARE

Filed Sept. 18, 1929  2 Sheets-Sheet 1

Witness:
W. B. Thayer

Inventor:
Edward H. Lorenz
by Brown & Parham
Attorneys

Patented Nov. 1, 1932

1,885,739

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR FABRICATING GLASSWARE

Application filed September 18, 1929. Serial No. 393,406.

My invention relates to apparatus for fabricating glassware, and has particular relation to apparatus wherein a charge of glass for a parison is gathered in a parison mold and neck mold by suction and is subjected to preliminary blowing pressure in said molds.

In fabricating glassware of charges gathered by the suction process, it is customary to dip a parison mold into a pool of glass, and to draw a charge into the parison mold and associated neck mold by vacuum. Generally, however, when the charge is gathered, a neck pin provided for the purpose of forming an initial blowing cavity in the parison, is held in downwardly projected position, partially obstructing the the communication between the interior of the mold and the vacuum passage in the blow head. In forming parisons by means of such construction, it is not possible to obtain the maximum vacuum effect in the mold in minimum time, and as a result, and undesirably long period of time may be required to fill the mold. This period of time also is prolonged in the constructions used heretofore because of the fact that the vacuum control valve usually is remotely situated with respect to the vacuum and blow head and the molds, and the vacuum is not applied to the molds until an appreciable time after said valve opens.

The operation of subjecting the parison in the parison mold to preliminary blowing pressure, which usually is employed, generally is performed some time after the withdrawal of the neck pin, and here also an undesirable lapse of time frequently occurs in the fabrication of the parison, because of improperly timed operations of the neck pin and blowing air valves. This operation also is apt to be attended by the difficulty of preventing the preliminary blowing air from passing through the joints in and between the parison and neck mold, which tends to cause defects on the body of the parison.

It is an object of the present invention to provide novel apparatus for fabricating glassware, whereby the above-mentioned and other difficulties may be overcome in a novel and efficient manner. To this end, the neck pin may be held retracted, or in uppermost position, to provide an unobstructed passage for the vacuum through the blow head and the neck and parison mold during the initial portion of the filling operation. As the level of the glass approaches the neck mold, the neck pin may be quickly and positively depressed, to form the initial blowing cavity in the parison and to assist in forming the neck finish. In this manner, the filling of the parison and neck mold may be accomplished more rapidly than has been practically possible heretofore. The application of vacuum may be controlled by a valve located in the blow head, which further reduces the period of time required to fill the molds with glass.

A further object of my invention is to provide a novel apparatus for fabricating glassware wherein the neck pin is constructed and arranged to control the application of preliminary blowing pressure to the parison. For this purpose, the neck pin may be adapted to open a blowing air passage in the blow head, thus insuring quick and positive application of the blowing pressure to the parison, at the desired time.

Another object of my invention is to provide a novel apparatus for forming glassware, wherein the vacuum control valve and the neck pin are operated by cams, the contours of which are designed to actuate the valve and neck pin at appropriate times. Said cams may be adjusted relatively to each other to vary the timed relation between the operations of the vacuum control valve and the neck pin. The apparatus of my invention may be further characterized by the provision of novel means for preventing preliminary blowing air from passing between the joints in and between the neck mold and the parison mold.

Other objects and advantages of the invention will be pointed out in the detailed description thereof which follows, or will become apparent from such description.

In order that the invention may be readily understood, reference should be had to the accompanying drawings, in which Fig. 1 shows a view in vertical transverse section of a fragmentary portion of apparatus embodying the said invention, and in which Figs. 2 to 5 inclusive diagrammatically illustrate the apparatus of Fig. 1 at different stages during the collection of a mold charge and the formation of a parison.

In said drawings:

A number of dipping frames, one of which is illustrated and designated generally at 1, may be supported upon a rotary table (not shown) in suitable known manner, and may be provided with suitable means for successively raising and lowering the frames toward and away from a gathering pool. Said frames, and the parison forming units supported thereby, may be identical in construction, and therefore a description of one will suffice for all. At its outer end, the frame 1 carries a vacuum and blow head 2. Supported below said blow head in suitable manner are holders 3 for the sections 4 of the neck mold. The frame 1 also carries the sections 5 of the parison mold, only one of which is shown.

The blow head 2 has a vertical opening 6 therein, near the bottom of which a shoulder 7 is formed. The shoulder 7 serves to support a thimble 8, the flange 9 of which rests thereon. The thimble 8 is held in position by means of a plug 10 which fits in the opening 6.

The thimble 8 projects below the bottom of the blow head and fits in recesses 11 formed in the neck mold sections, when the neck mold is closed. In the bottom of the thimble, outwardly and downwardly inclined passages 12 are formed, which communicate with a groove 13 on the bottom of the thimble. Passages 14 lead from the groove 13 into the upper portion of the neck mold cavity.

Slidably mounted in the plug 10 and extending downwardly through the thimble 8 is the neck pin or plunger 15. Near its bottom end, the neck pin carries a collar 16 which slidably engages the interior of the thimble 8, serving as a guide for the neck pin, and engages the bottom of the thimble to limit the downward movement of the neck pin. The collar 16 is slotted, as shown, to permit the passage of fluid pressure thereby. When the neck pin is in raised position, the passageway through the thimble is substantially unobstructed; but when said neck pin is lowered, the tip thereof fits loosely in the opening 17 of the thimble and only a restricted passageway is afforded, as shown in Figure 1. Between the collar 16 and the upper portion of the neck pin, said neck pin has a reduced portion 18, the length of which is such that when the neck pin is elevated to the required height, a port 19 formed in the plug 10 will be uncovered. The port 19 permanently registers with a similar port 20 formed in the blow head, and to which is connected a conduit 21, leading from a suitable source of blowing air, not shown. Thus, the raising and lowering of the neck pin, controls the admission of blowing air into the blow head and neck mold, and also the effective area of the opening 17 in the thimble 8.

The neck pin 15 is connected at its upper end to a clevis 22 pivotally connected to a tubular member 23 having telescopic engagement with a similar member 24, pivotally connected to the outer end of a lever 25. The members 23 and 24 are held in assembled relation by a pin and slot connection, as shown. A spring 26 is interposed between the opposite ends of members 23 and 24 to provide a yielding connection between the lever 25 and the neck pin.

Lever 25 is pivoted at 27 to an upstanding bracket 28 provided on the frame 1. At its inner end, the lever 25 carries a cam roller 29 which engages an outwardly facing cam 30 formed in a crown 31. The crown 31 is adjustably secured by suitable means, such as bolts, one of which is shown at 32, to an upstanding flange 33 provided on a shelf 34. The shelf 34 may be secured to a stationary column, not shown, of the machine in suitable known manner.

Located in the blow head 2 is a vacuum control valve 35, of the poppet type, which is adapted to control communication between an upper horizontal vacuum port 36 and a lower horizontal passageway 37 formed in the blow head. The passageway 37 leads through a radial port 38 into a central opening 39 provided in the plug 10, and opening into the interior of the thimble 8, previously referred to. Another radial port 40 formed in the plug 10 leads into a vertical passageway 41 provided in the blow head, and in which passageway is located a ball check valve 42. Beneath the check valve 42, the passageway 41 communicates with an annular groove 43 in the bottom of the blow head, which registers with downwardly and inwardly inclined passages 44 in the neck mold, when the neck mold is closed. The passages 44 in turn register with vertical passages 45 in the parison mold when it also is closed. From the foregoing it will be seen that when the vacuum valve 35 is opened, vacuum will be created in the neck mold and parison mold cavities through the opening 17 in the thimble, and through the passages 41, 44 and 45 against retaining pin 42ª, which have restricted communications with the cavities of the molds through the joints thereof when the molds are closed. When the vacuum valve 35 is first opened, the neck pin will be in raised position, and the opening 17 will be unobstructed. But as the parison mold becomes filled with glass, the neck pin will be lowered, and a restricted application of vacuum to the interior of the neck mold will be effected through the passages 12, 13 and 14 and between the tip of the plunger and the wall of the opening 17. During the initial portion of the filling operation, the neck pin will not be raised sufficiently high to open the blowing air port 19; but after the valve 35 is closed, the neck pin may be raised sufficiently high at the proper time to open said port, thus admitting the blowing air. The air thus admitted has free access to the interior of the neck mold but is prevented from passing through the joints in and between the molds by the check valve 42.

The valve 35 is opened and closed by means of a lever 46 pivoted at 47 to the bracket 28. At its outer end, the lever 46 carries an adjustable screw 48 which engages the top end of the stem of the valve 35. The spring 51 tends to maintain the valve 35 closed. By adjusting the screw 48, the degree of opening of the valve may be varied. The inner end of lever 46 has a cam roller 49 mounted thereon, which engages a cam 50 formed on the shelf 34, previously referred to. The contour of the cam 50 is of suitable shape to open the vacuum control valve at the proper time, and to hold said valve open for the desired period.

As previously stated, cam 31 may be adjusted relative to the shelf 34 and hence relative to the cam 50. This permits variations in the timed relation between the operations of the vacuum control valve and of the neck pin, which neck pin also serves as a preliminary blow valve. Cams 30 and 50 also are shaped so as to permit the raising and lowering of the frame 1 and the head and molds supported thereby, without operating levers 25 and 46. For this purpose, suitable inclined portions (not shown) are provided on said cams. If it is desired to blow the parison through the neck ring, the neck pin may be employed for controlling the application of final blowing air to the parison after it has been enclosed by a finishing mold (not shown).

Figure 3:
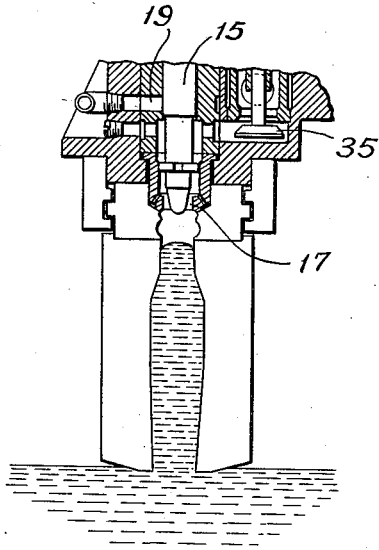
Figure 4:
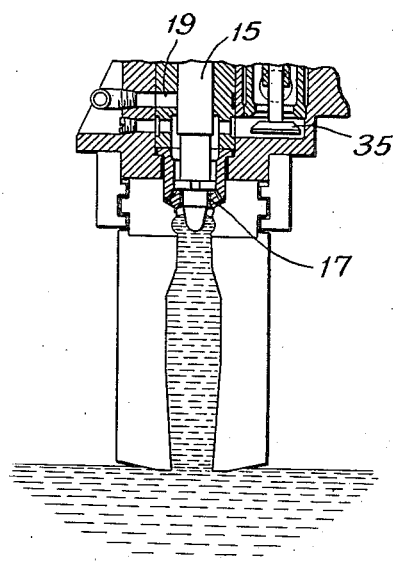
Figure 5:
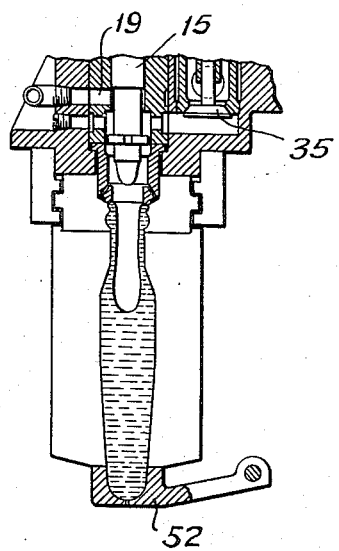

One preferred mode of operation of the apparatus described herein is as follows:

As the dipping frame and the mold supported thereby are rotated by a suitable mechanism, not shown, the molds are moved over a gathering pool, and are lowered into a position to permit the bottom of the parison mold to contact with the glass in the pool. At the instant of such contact (shown in Fig. 2), valve 35 will be opened, and the neck pin 15 will be held elevated at the proper height to permit unobstructed application of vacuum to the interior of the neck and parison molds, but not sufficiently high to open the blowing air port 19. As shown in Fig. 3, the glass rises in the mold cavity. As the parison mold is nearly filled with glass (see Fig. 4), the neck pin is quickly lowered by the lever 25 and cam 30, the tip thereof being moved into position to form the initial blowing cavity in the charge of glass and to assist in the shaping of the neck finish. When in such position the tip of the neck pin will restrict the passage 17 through which, however, sufficient vacuum will be applied to produce the desired neck finish on the parison. The application of vacuum may be maintained until after the dipping frame and the molds have been swung away from the gathering pool, or may be terminated prior to that time, as desired. Fig. 1 shows the condition of the apparatus and of the collected glass at the time at which the valve 35 closes. As will be understood, the time at which the valve 35 closes to terminate the application of vacuum will be controlled by the shape of the cam 50. When said valve has closed, neck pin 15 is raised by the operation of the lever 25, but without opening port 19, and at the desired time thereafter the plunger may be raised sufficiently high to open the preliminary blowing air port 19 (see Fig. 5). Thereupon, the preliminary blowing air will be admitted into the blowing head and will pass through the thimble 8, and the passageways formed therein, to compress the glass in the neck and parison molds. At the time that the preliminary blowing pressure is applied, a shear blade, not shown, may be held in engagement with the bottom of the parison mold to support the parison, in accordance with a known practice; or a bottom plate 52 (Fig. 5) having a mold cavity formed therein may be brought into engagement with the parison mold in accordance with the method disclosed in the application of Karl E. Peiler, Serial No. 316,982, filed Nov. 3, 1928. If such a bottom plate is employed, more than usual enlargement of the initial blowing cavity will result and the parison will be expanded in a highly desirable manner as shown in Fig. 5. Subsequently, the neck pin 15 may be lowered sufficiently to close the blowing air passage, by the operation of the cam 30 and lever 25, the parison mold is opened, and the parison is transferred to a finishing mold in which it may be blown to final form, in a known manner.

Having thus described my invention, what I desire to claim and secure by Letters Patent is:

1. Apparatus for fabricating glassware comprising a suction head, a neck mold and a parison mold, means for supporting said head and mold for movement toward and away from a gathering pool, valve means for applying vacuum to said molds to gather a charge of glass from said pool, a member operated in response to the movement of said supporting means for actuating said valve means, a neck pin in said head, means including a cam and mechanism operated thereby for holding said neck pin retracted as the parison mold is filled with glass, and for projecting said neck pin into the neck mold as the filling of the parison mold nears completion and when the glass therein has reached a predetermined level, and means for varying the timed relation between the operation of said member and of said cam operated mechanism to change the timed relation between the application of vacuum to said molds and the operation of said neck pin.

2. Apparatus for fabricating glassware comprising a suction head, a neck mold and a parison mold, means for supporting said head and mold for movement toward and away from a gathering pool, a valve for applying vacuum to said molds to gather a charge of glass from said pool, a cam for operating said valve, a neck pin in said head, a cam for holding said neck pin retracted as the parison mold is filled with glass, and for projecting said neck pin into the neck mold as the filling of the parison mold nears completion and when the glass has reached a predetermined level therein, and means for adjusting said cams relative to each other to vary the timed relation between the application of vacuum to said molds and the operation of the neck pin.

3. Apparatus for fabricating glassware comprising a suction head, a neck mold and a parison mold, means for supporting said head and molds for rotation toward and away from a gathering pool, means for applying vacuum to said molds to gather a charge of glass from said pool, a neck pin in said head, and means operating in response to the rotation of said head and molds for holding said neck pin retracted during a portion of the period of application of vacuum to said molds and while the parison mold is being filled with glass, and for thereafter projecting said neck pin into the neck mold to form a cavity in the glass, when the glass has reached a predetermined level in the parison mold.

4. Apparatus for fabricating glassware comprising a suction mold, a suction head for said mold, a chamber in said head, separate vacuum and air pressure passages opening into said chamber, a neck pin permanently located in said head, means for operating said neck pin, and means actuated by said neck pin operating means for opening and closing said air pressure passage independently of the application of vacuum to said chamber through said vacuum passage.

5. Apparatus for fabricating glassware comprising a suction head, a neck mold and a parison mold associated with said head, a neck pin in said head, means for applying vacuum through said head to the molds, and means for positively holding said neck pin in one position to permit unrestricted application of vacuum to the molds, for projecting the neck pin into the neck mold, and for moving the neck pin into a third position to admit blowing air into the head and the cavity of the neck mold, 6. Apparatus for fabricating glassware comprising a suction head, a neck mold and a parison mold associated with said head, a vacuum valve in said head for applying vacuum to said molds, a cam for operating said valve, a blowing air port in said head, a neck pin permanently positioned in said head, and a cam for operating said neck pin to open and close said blowing air port.

7. In glassware fabricating apparatus, an open ended suction gathering receptacle adapted to be moved to and from glass gathering relation with a pool of molten glass, means providing passages communicating at different levels with the interior of the gathering receptacle and respectively adapted for connection with a source of suction and a source of preliminary blowing pressure, a neck pin movable axially of the upper part of said gathering receptacle for coöperating with the adjacent walls of said receptacle to impart a preliminary shape to the upper portion of the gathered glass in the receptacle, said neck pin being adapted to close communication between said passage for preliminary blowing pressure and the interior of the gathering receptacle and to restrict communication between the suction passage and the interior of the gathering receptacle when the neck pin is in its downwardly projected position, to open both said passages when the neck pin is in its highest position and to close the passage for the preliminary blowing pressure without obstructing the passage for suction when the neck pin is in an intermediate position, and means for moving said neck pin to its respective aforesaid positions at times regulable with respect to the movement of the gathering receptacle to its glass gathering position.

8. In glassware fabricating apparatus, an open ended glass gathering receptacle adapted to be moved to and from a glass gathering position at the surface of a pool of molten glass, means providing vertically spaced passages respectively adapted for connection with a source of suction and a source of preliminary blowing pressure and communicating with the interior of the gathering receptacle at different levels, a neck pin movable axially in the upper part of said gathering receptacle from a retracted relatively raised position to a downwardly projected lower position, said neck pin being adapted when in its retracted position to open communication between both of said passages and the interior of the gathering receptacle and adapted when in its downwardly projected position to shut off communication between the passage for the preliminary blowing pressure and the interior of the gathering receptacle and to restrict communication between the passage for the suction and the interior of the gathering receptacle, and cam actuated means for raising and lowering said neck pin independently of said gathering receptacle and in timed relation with the movement of said gathering receptacle to and from its glass gathering position at the surface of said pool.

9. In glassware fabricating apparatus, an open ended gathering receptacle adapted to be moved to and from a glass gathering position in contact with the glass of a gathering pool, means at the upper end of said gathering receptacle providing a passage adapted for connection with a source of suction and in open communication with the interior of the upper part of the gathering receptacle, a neck pin movable axially of the upper part of the gathering receptacle from a retracted position above the place of communication of said suction passage with the interior of the receptacle to position to project at its lower end below said place of communication, said neck pin being adapted when in its downwardly projected position to restrict communication between said suction passage and the interior of the gathering receptacle, a valve for controlling communication between said suction passage and said source of suction, cam actuated means for raising and lowering said neck pin between its said positions, and cam actuated means for opening and closing said valve in timed relation with the movements of said neck pin.

Signed at Hartford, Connecticut, this 17th day of September, 1929.

EDWARD H. LORENZ.